United States Patent
Nielsen et al.

(10) Patent No.: US 12,529,080 B2
(45) Date of Patent: Jan. 20, 2026

(54) FATTY ACID ESTERIFICATION PROCESS

(71) Applicant: Novozymes A/S, Bagsvaerd (DK)

(72) Inventors: Per Munk Nielsen, Hilleroed (DK); Anders Rancke-Madsen, Charlottenlund (DK); Rasmus Boeg Hansen, Frederiksberg (DK)

(73) Assignee: Novozymes A/S, Bagsvaerd (DK)

( * ) Notice: Subject to any disclaimer, the term of this patent is extended or adjusted under 35 U.S.C. 154(b) by 902 days.

(21) Appl. No.: 17/769,020

(22) PCT Filed: Oct. 14, 2020

(86) PCT No.: PCT/EP2020/078859
§ 371 (c)(1),
(2) Date: Apr. 14, 2022

(87) PCT Pub. No.: WO2021/074201
PCT Pub. Date: Apr. 22, 2021

(65) Prior Publication Data
US 2024/0101926 A1 Mar. 28, 2024

(30) Foreign Application Priority Data
Oct. 17, 2019 (EP) .................................. 19203874

(51) Int. Cl.
C12P 7/6454 (2022.01)
B01D 3/06 (2006.01)
C07C 67/08 (2006.01)
C11C 3/00 (2006.01)
C11C 3/02 (2006.01)
C11C 3/06 (2006.01)
C12P 7/6458 (2022.01)
C12P 7/649 (2022.01)

(52) U.S. Cl.
CPC .............. *C12P 7/6454* (2013.01); *B01D 3/06* (2013.01); *C07C 67/08* (2013.01); *C11C 3/003* (2013.01); *C11C 3/02* (2013.01); *C11C 3/06* (2013.01); *C12P 7/6458* (2022.01); *C12P 7/649* (2013.01)

(58) Field of Classification Search
CPC .......... C11C 3/06; C11C 3/003; C12P 7/6454; C12P 7/649; B01D 3/06; C07C 67/08
See application file for complete search history.

(56) References Cited

FOREIGN PATENT DOCUMENTS

| WO | 2012098114 A1 | 7/2012 | |
|----|---------------|--------|---|
| WO | 2012106701 A1 | 8/2012 | |
| WO | 2012130961 A1 | 10/2012 | |
| WO | 2013116342 A2 | 8/2013 | |
| WO | 2017060471 A1 | 4/2017 | |
| WO | WO 2017/06047 | * 4/2017 | ................ C12P 7/64 |

OTHER PUBLICATIONS

Fojan, P,. et al., What distinguishes and esterase from a Lipase: A novel structural approach, Biochimie, 82, pp. 1033-1041 (Year: 2000).*

* cited by examiner

Primary Examiner — Yate' K Cutliff
(74) Attorney, Agent, or Firm — Eric J. Fechter

(57) ABSTRACT

The present invention relates to a process for enzymatic esterification of free fatty acids. In particular the invention relates to this process using a flash operation for water removal from enzyme reaction mixture.

17 Claims, 8 Drawing Sheets

FATTY ACID ESTERIFICATION PROCESS

CROSS-REFERENCE TO RELATED APPLICATIONS

This application is a 35 U.S.C. 371 national application of international application no. PCT/EP2020/078859 filed Oct. 14, 2020, which claims priority or the benefit under 35 U.S.C. 119 of European application no. 19203874.3 filed Oct. 17, 2019. The contents of these applications are fully incorporated herein by reference.

FIELD OF THE INVENTION

The present invention relates to a process for enzymatic esterification of free fatty acids. In particular the invention relates to this process using a flash operation for water removal from enzyme reaction mixture.

BACKGROUND OF THE INVENTION $CO_2$ stemming from fossil fuels causes environmental problems, and this forces the world to seek sustainable solutions.

Conventional diesel fuel stemming from fossil carbon sources is currently a major contributor to the $CO_2$ emissions, and the development of sustainable and renewable fuels capable of driving existing diesel motors would be a possible way of lowering the diesel related $CO_2$ emissions. Such a fuel is for instance fatty acid methyl esters also called biodiesel, are obtainable through the esterification of fatty acids originating from oils and fats consisting of glycerides and free fatty acids (FFA).

The biomass feedstocks for biodiesel production consist mainly of glycerides, but cheap, low quality feedstocks often also hold significant amounts of free fatty acids (FFA). However, FFA are also a potential source of biodiesel as they are convertible into biodiesel through (trans)esterification.

Traditionally, production of biodiesel has been done through chemical catalysis. Alkaline-catalyzed biodiesel production through transesterification of glycerides is the most commonly used method but has drawbacks. Importantly, chemical alkaline catalysis is unable to handle low and varying feedstock qualities where the concentration of FFA is significant. In order to exploit such feedstocks, extensive pretreatment is required. Today, a typical pretreatment is sulfuric acid catalyzed esterification of FFA.

The requirement for extensive pre-processing is a problem as this greatly reduces the profitability of the process. To obtain a greener, more profitable, and more robust process in terms of usability of low-quality feedstocks, enzymatic catalysis offers a solution.

Enzymatic catalysis is less sensitive to feedstock qualities. It requires operating conditions much closer to ambient, and results in smaller, cleaner, and more easily disposable waste streams because of high selectivity and low additive requirements. Additionally, enzymes are renewable catalysts and processes utilizing enzymes tend to be greener than chemical processes.

Enzymatic biodiesel processes require only minor pre-processing relative to the chemical processes, and are able to convert both FFA and glycerides to biodiesel.

However, enzymatic processes do have some limitations. The enzymatic esterification reaction of free fatty acids with short chain alcohols to biodiesel and water, is reversible. As such, an excess of water will drive the reaction in the direction which is unfavourable to biodiesel production. At the same time, the removal of water which would favour the formation of biodiesel, would have the negative effect of decreasing enzyme stability.

Although the current enzymatic process yields high conversion, the product still contains 2-3 wt % FFA (regardless of feedstock) due to the unavoidable equilibrium. One solution could be to use a caustic wash to eliminate the residual FFA, but because it produces soap, this requires extra processing with significant amounts of waste water as byproduct Thus, there is still a need for development of enzymatic process for biodiesel production, in particular where the efficiency of the enzymatic process is increased.

A further object may be to avoid the caustic wash in order to reduce waste production and soap recovery cost.

SUMMARY OF THE INVENTION

The invention relates in a first aspect to a process for enzymatic esterification of free fatty acids, comprising the steps of:
a. providing a composition comprising free fatty acids i),
b. adding to the composition provided in step a.:
  ii) esterase,
  iii) glycerol, and
  iv) short chain alcohol
    and mixing
c. incubating the mixture of step b. such that the esterase catalyses esterification of
free fatty acids,
d. flash drying the incubated mixture resulting from step c.;
e. optionally mixing the flash-dried mixture obtained in step d. with further short chain alcohol v)
f. incubating the mixture obtained in step e., whereby the esterase (ii) provided in step b. catalyses esterification of free fatty acids.

The invention relates in a second aspect to the use of an esterase in the method according the invention.

The invention in a third aspect relates a process for flash drying of a mixture comprising free fatty acids, said mixture comprising free fatty acids, esterase, glycerol, short chain alcohol and water; and said process comprising the steps of providing said mixture and subsequently flash drying said mixture wherein the flash drying is done under conditions which do not denature the esterase.

Step a., Step b., Step c., Step d., Step e., Step f., Step g., Step h., and Step i. are steps in the method of the invention, as described in Claim 1. Compositions are indicated: i)—composition comprising fatty acids; ii)—esterase, iii)—glycerol, iv)—short chain alcohol, in one embodiment methanol; v) short chain alcohol, in one embodiment methanol; vi)—Light phase; vii)—Heavy phase (comprising glycerol, esterase and short chain alcohol, in one embodiment methanol), viii)—biodiesel.

Figure 2:
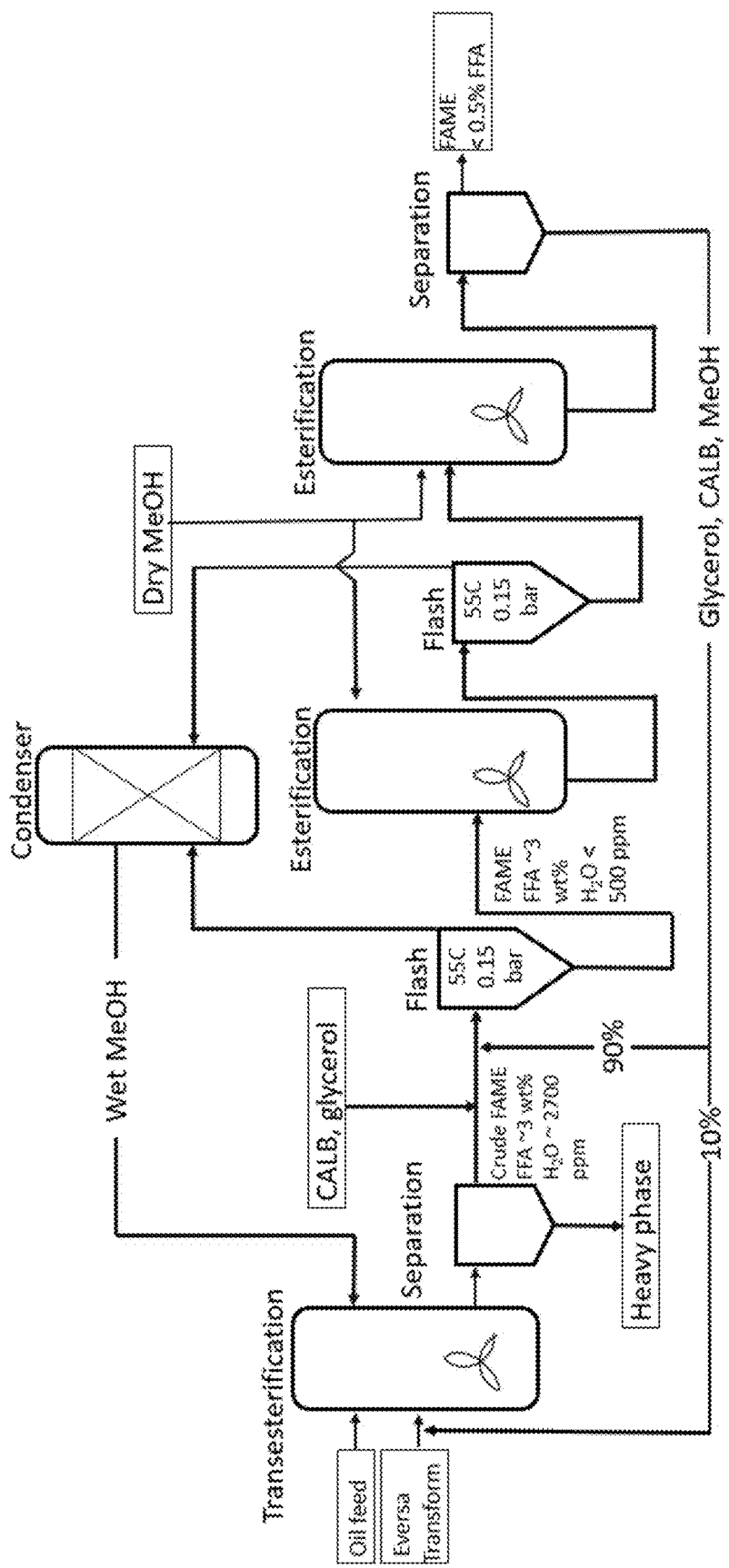

FIG. 2 shows a schematic outline of a process for manufacturing fatty acid alkyl esters by enzyme catalysed transesterification of fatty acids or a fatty acid feedstock with alcohol.

Figure 3:
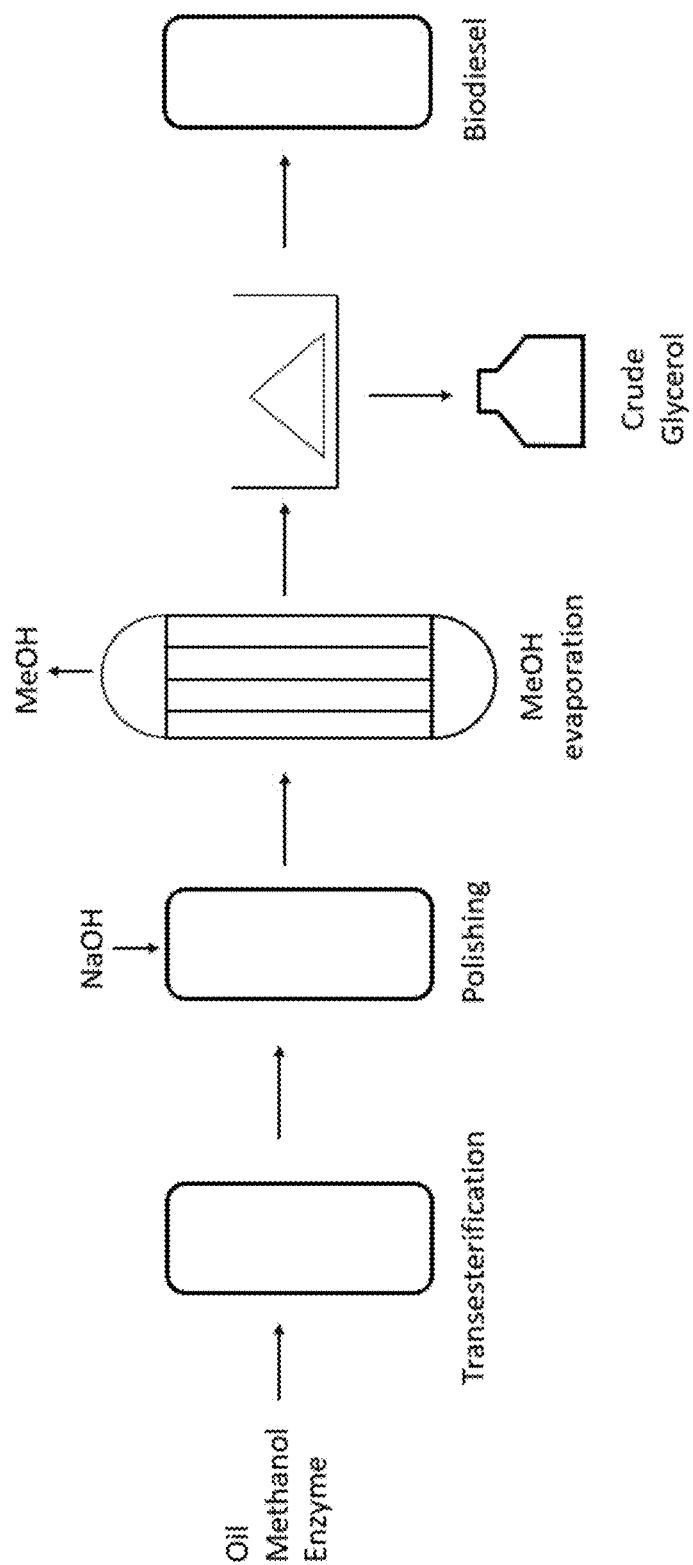

FIG. 3 shows a schematic outline of a typical enzymatic biodiesel transesterification process which includes an alkaline wash to eliminate FFA after the enzyme step.

Figure 4:
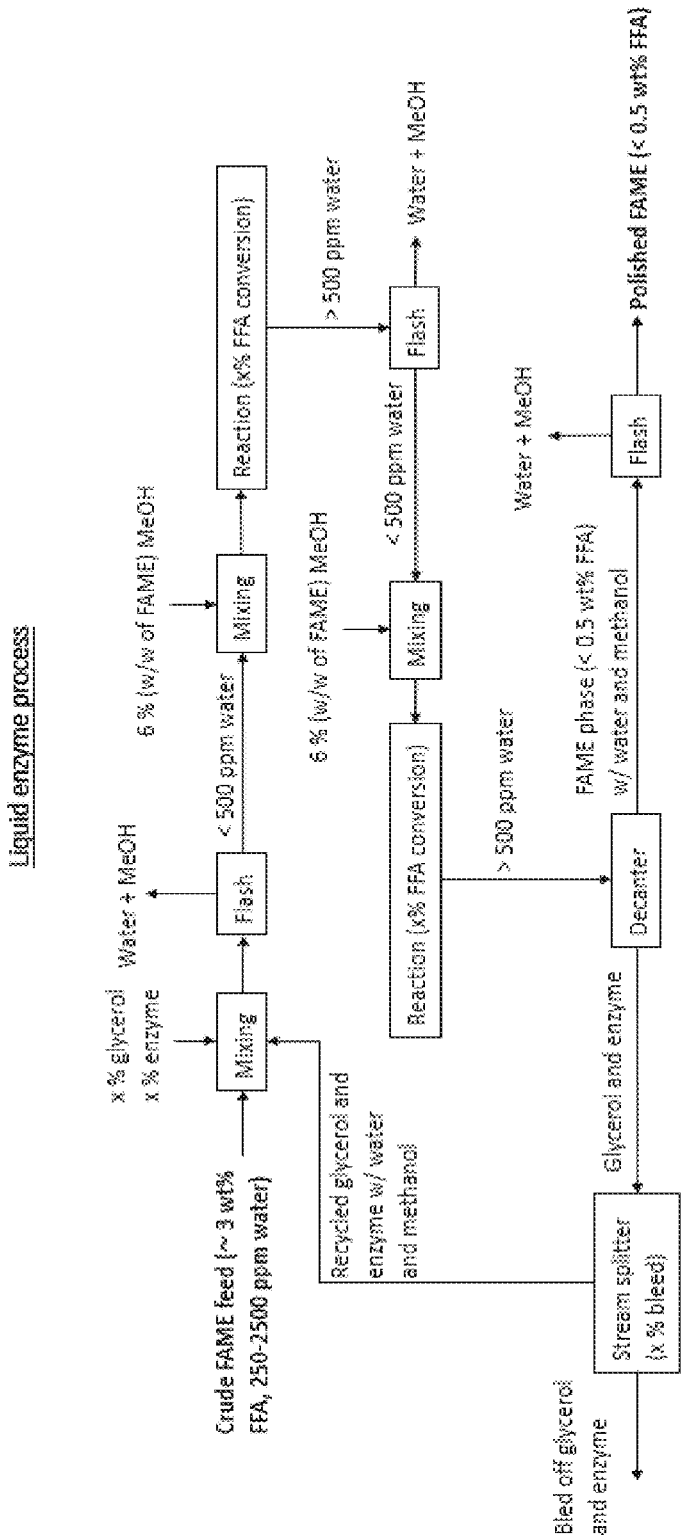

FIG. 4 shows a schematic overview of the invented process for FFA esterification. (Bleed off corresponds to purge).

Figure 5:
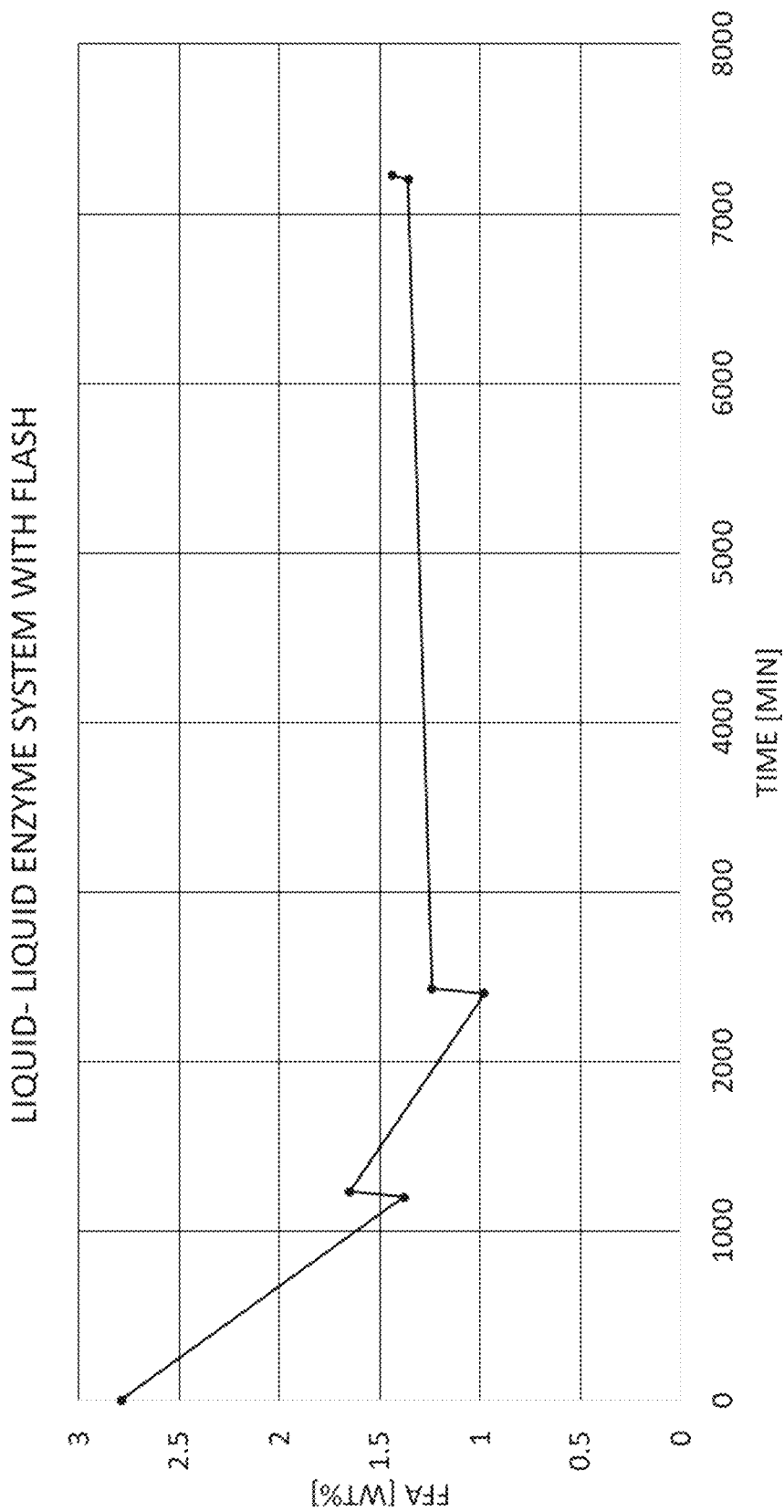

FIG. 5 shows the results from Example 1. The amounts of FFA are reduced over time.

Figure 6:
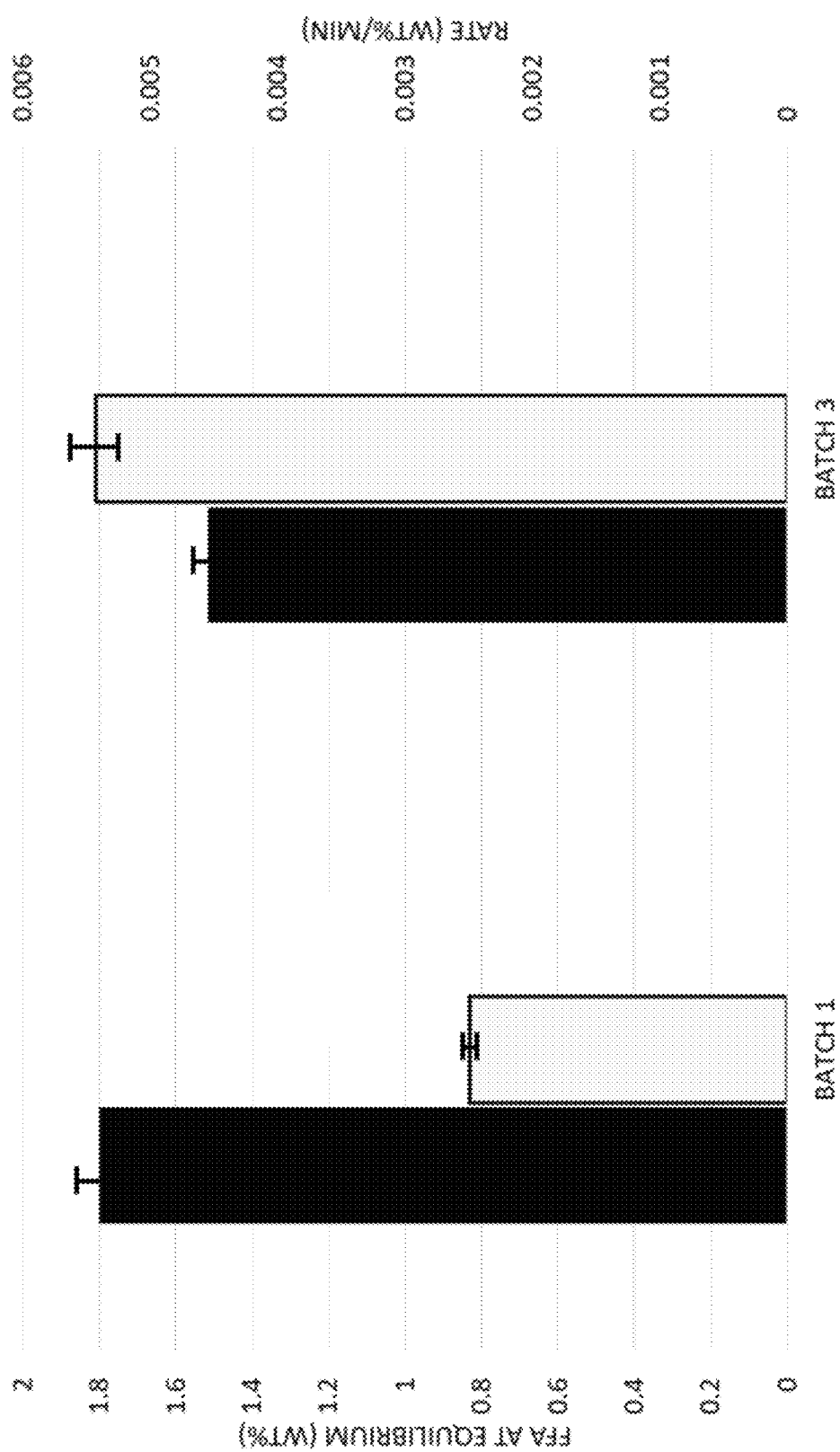
Figure 7:
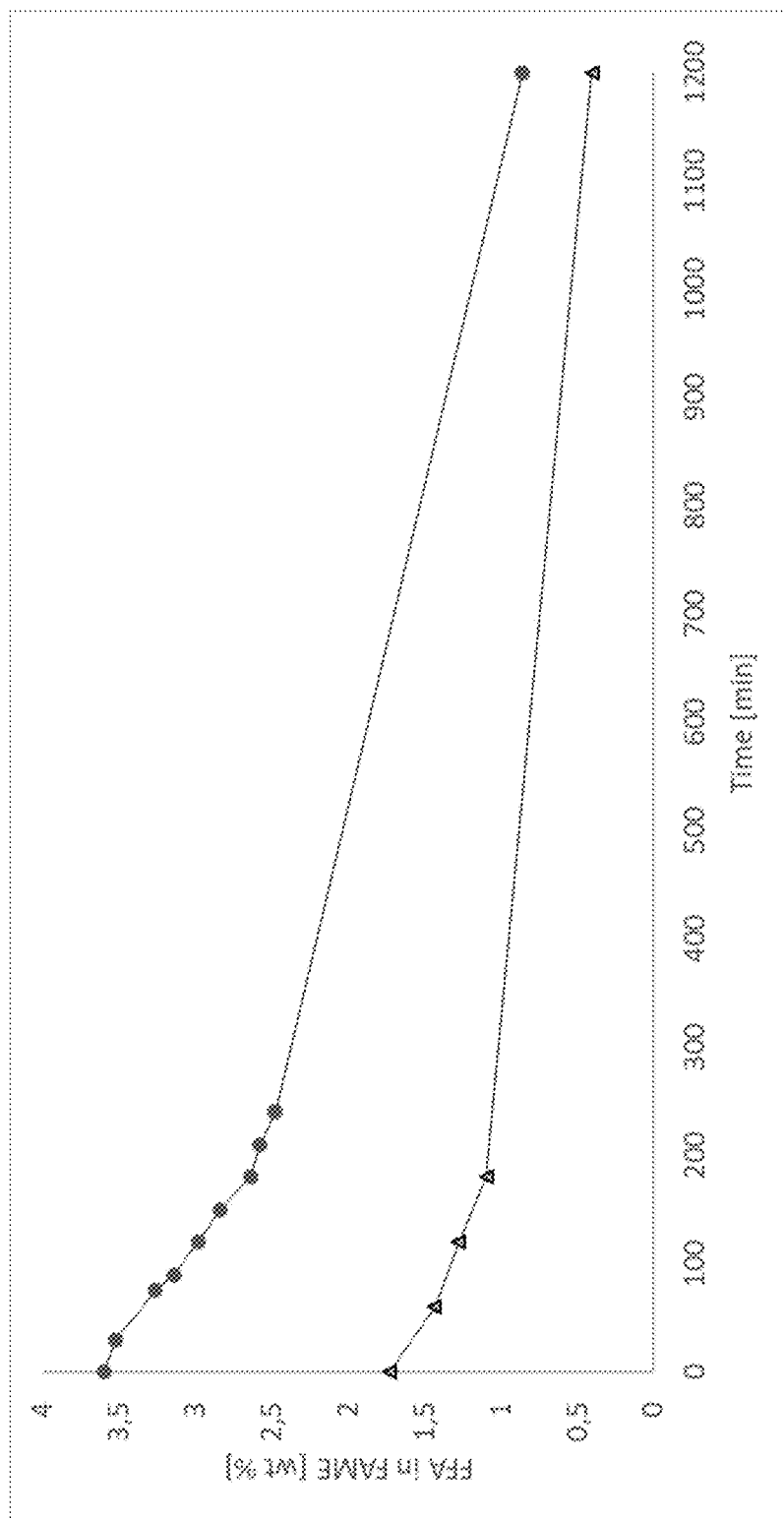

FIG. 6 shows the results from Example 3: Esterase and glycerol reuse. Black column: Initial rate, grey column: FFA at equilibrium FIG. 7 shows the results from Example 4 Stepwise drying. Circles: 1% Lipozyme CALB L, 5% glycerol, 4% methanol, 300 g FAME, Initial water=5500 ppm. Triangles: 0.455% Lipozyme CALB L, 5% glycerol, 6% methanol, 30 g FAME, Initial water=2000 ppm.

Figure 8:
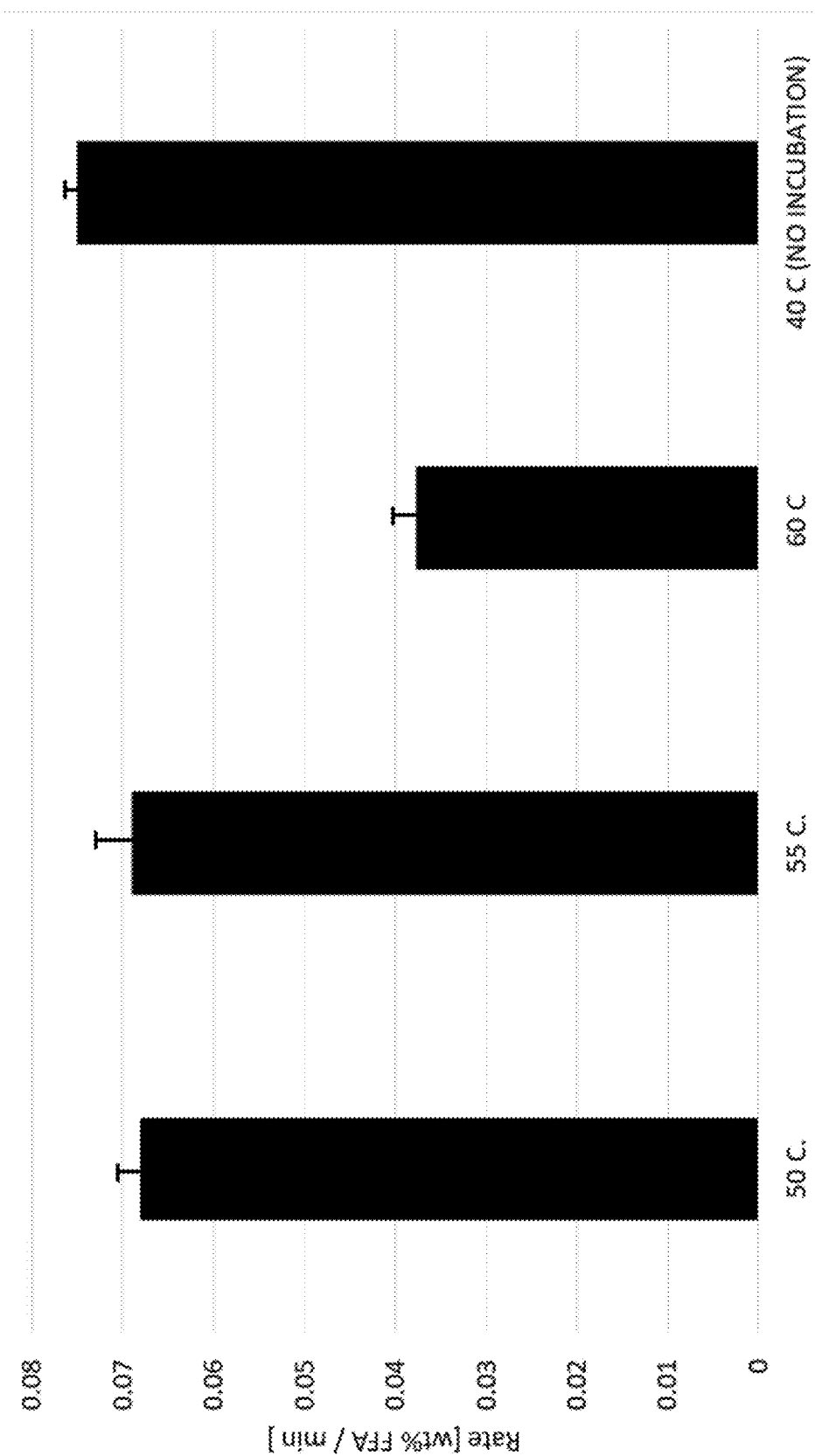

FIG. 8 shows the results from Example 5. Rate of FFA conversion after incubation at different temperatures.

The figure(s) have been included for illustration purposes alone and should not be construed as limiting the invention. CALB (*Candida antarctica* lipase B) is an example of esterase that can be used for the invention.

DETAILED DESCRIPTION OF THE INVENTION

Definitions

Biodiesel—the term biodiesel is used to refer to the fatty acid alkyl esters (FAAE) of short chain alcohols, such as fatty acid methyl esters (FAME) and/or fatty acid ethyl esters (FAEE), because they are used as an additive to or as replacement of fossil fuel.

Short-chain alcohol—the term short chain alcohol (SCA) is used to refer an alcohol having 1 to 5 carbon atoms.

Fatty acid feedstock—the term "fatty acid feedstock" is defined herein as a substrate comprising any source of fatty acids, including methyl esters, ethyl esters, triglycerides, diglycerides, monoglycerides, or any combination thereof. In principle, any oils and fats of vegetable or animal origin comprising fatty acids may be used as substrate for producing fatty acid alkyl esters in the process of the invention.

The fatty acid feedstock used according to the present invention may comprise or consist of one or more of algae oil, canola oil, coconut oil, castor oil, coconut oil, copra oil, corn oil, distiller's corn oil, cottonseed oil, flax oil, fish oil, grape seed oil, hemp oil, jatropha oil, jojoba oil, mustard oil, canola oil, palm oil, palm stearin, palm olein, palm kernel oil, peanut oil, rapeseed oil, rice bran oil, safflower oil, soybean oil, sunflower oil, tall oil, oil from halophytes, and/or animal fat, including tallow from pigs, beef and sheep, lard, chicken fat, fish oil, palm oil free fatty acid distillate, soy oil free fatty acid distillate, soap stock fatty acid material, yellow grease, and brown grease or any combination thereof.

The term fatty acid feedstock is used herein interchangeably with the term biodiesel feedstock.

Overview of the Process

In the first step of the process according to the invention, step a., a composition comprising free fatty acids is provided. This composition is denoted i).

In a second step, step b., glycerol ii), esterase iii) and short chain alcohol (e.g. methanol and/or ethanol) iii) are added to the composition i) and mixed.

The order of step a. and step b. is not critical; i.e., the components i) to iv) may be provided in any order and mixed in any order. For example, the i) may be a biodiesel feedstock (defined elsewhere herein) and the components ii)-iv) may be added to the tank in which the biodiesel feedstock is provided, and all components are mixed.

The invented process may be may be viewed as the second step in a two-step enzymatic transformation of biodiesel feedstock to biodiesel, where the first step is enzymatic transesterification by lipase (e.g. a *Thermomyces lanuginosus* lipase), and the second step is the esterification of free fatty acids to biodiesel by esterase (e.g. CALB). In this case, the composition i) could be the light phase of the reaction mixture from enzymatic transesterification.

Alternatively, the composition i) could be the full reaction mixture from transesterification reaction which is then dried to drive the esterification process.

The mixture is then incubated in an enzyme reactor. The enzyme reactor may be any vessel suitable for enzyme incubation, and the parameters for the incubation are selected in order to facilitate the enzyme reaction. A person of skill in the art is aware of the parameters, and will be able to select e.g. the temperature, mixing, vessel to support this enzyme reaction.

The enzyme reaction mixture after incubation, i.e., the mixture comprising enzyme reaction products and remains of the components provided and mixed together in step b., is subjected to flash drying.

The invention is based on the surprising recognition that the enzyme reaction mixture will dry in a flash dryer even at mild conditions. The flash drying of step d. is performed under these mild conditions.

The flash-dried enzyme reaction mixture will contain esterase remaining from the initial addition at step b., and this enzyme will retain at least partial activity. As the mixture also has had water removed, and this mixture can be subject to a second incubation in an enzyme reactor (step f.) in order to further reduce the free fatty acids content. In order for this reaction to proceed, the short chain alcohol content may be supplemented by a step e. of addition of short chain alcohol v) to the dried enzyme reaction mixture after flash dryer step d., and before second enzyme incubation step f.

The enzyme reaction mixture after the second enzyme incubation is separated in step g. Typically this is done by decanting, and results in a light phase (vi) and a heavy phase (vii).

The light phase contains the FAME, i.e. biodiesel. This may be dried by a one-step flash drying step, i.e. a conventional flash drying at temperature and conditions typically used to dry biodiesel.

The composition achieved in step h. is composition viii), a fame product (i.e. a biodiesel).

The heavy phase comprises glycerol, esterase and short chain alcohol. Due to the mild flash-drying conditions that were used in step d., the esterase still will retain activity. Furthermore, the components glycerol and short chain alcohol are also needed for the reaction of free fatty acids to biodiesel.

Thus, the heavy phase may be recycled, in its entirety or in part, in the process. The heavy phase may be fed back to the step b. in the process, where glycerol, esterase and short chain alcohol are added to the composition .i) and mixed. The components in step b. may derive wholly or in part from the heavy phase. In some embodiments, the recycled heavy phase may be supplemented by addition of fresh glycerol, short chain alcohol and/or esterase.

The process and further embodiments will be described in detail in the following.

Figure 1:
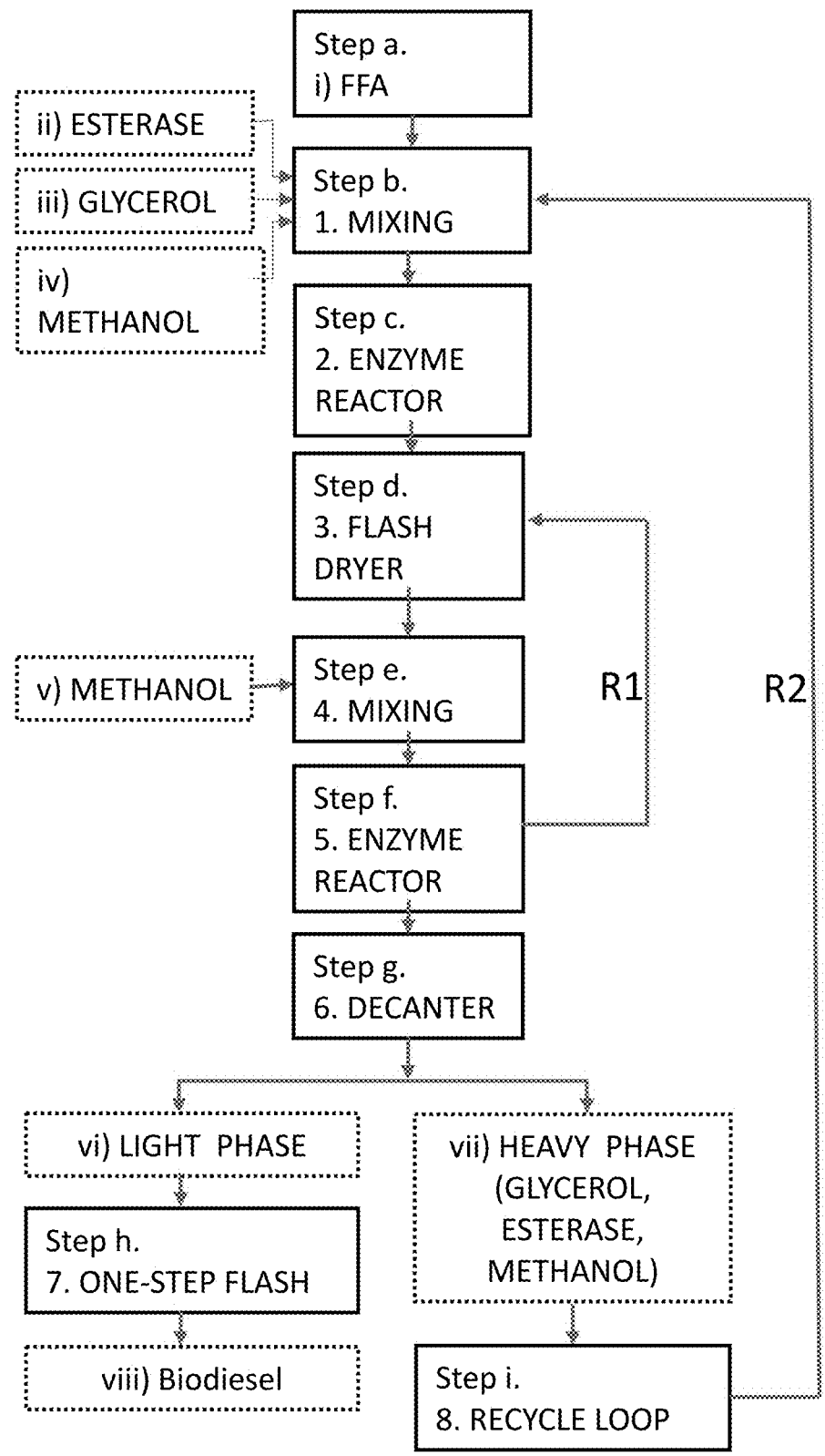
FIG. 1 shows a flow chart over one embodiment of the process according to the invention.

See also FIG. 1 for an overview of one embodiment of the invention.

The invention in one aspect thus relates to a process for enzymatic esterification of free fatty acids, comprising the steps of:
 a. providing a composition comprising free fatty acids i),
 b. adding to the composition provided in step a.:
  ii) esterase,
  iii) glycerol, and
  iv) short chain alcohol
   and mixing
 c. incubating the mixture of step b such that the esterase catalyses esterification of free fatty acids,
 d. flash drying the incubated mixture resulting from step c.;
 e. optionally mixing the flash-dried mixture obtained in step d. with further short chain alcohol v)
 f. incubating the mixture obtained in step e., whereby the esterase ii) provided in step b catalyses esterification of free fatty acids.

1.1 Step a.—Providing a Composition Comprising Free Fatty Acids i)

The composition comprising free fatty acids (referred to as i), see also flow chart in FIG. 1) which is provided in step a. is the starting material for production of FAME using the present method.

Thus, in some embodiments the composition i) comprises fatty acids in an amount in the range of from 0.25 to 10 wt %, such as 1 to 8 wt %, 1 to 7 wt %, 1 to 5 wt %, or 1 to 4 wt %; or for example 1 to 6 wt %, such as 2 to 6 wt %, or 2 to 4 wt %.

Some embodiments relate to the process according to the invention wherein the composition i) provided in step a. is a biodiesel feedstock.

Some biodiesel feedstocks have high levels of free fatty acids. For example, fatty acid distillates from palm or soy, acid oils, animal fats or similar feedstocks that can contain from 10-90% FFA. These feedstocks are typically esterified with sulfuric acid or a resin as catalyst to prepare it for an alkaline catalyzed transesterification with for instance Na-metoxylate.

Thus, further embodiments relate to where the composition i) comprises free fatty acids in an amount in the range of more than 10 wt %; such as a in the range from 10-90 wt %, such as in the range from 10 to 85 wt %, 10 to 80 wt %, 10 to 75 wt %, 10 to 70 wt %, 10 to 65 wt %, 10 to 60 wt %, 10 to 55 wt %, 10 to 50 wt %, 10 to 45 wt %, 10 to 40 wt %, 10 to 35 wt %, 10 to 30 wt %, 10 to 25 wt %, 10 to 20 wt %, 10 to 15 wt % of free fatty acids; or for example 10 to 85 wt %, 15 to 80 wt %, 20 to 75 wt %, 20 to 65 wt %, 20 to 55 wt % of free fatty acids.

A biodiesel feedstock may for example be vegetable oil, animal fat or microbial oil, or combinations thereof. Thus, biodiesel feedstock may be selected from the group consisting of castor oil, cottonseed oil, corn oil, palm oil, peanut oil, rapeseed oil, rice bran oil, soybean oil, fish oil, tallow, lard, mutton oil, yeast oil, microagal oil, fatty acid distillates and combinations thereof.

Some embodiments relate to the process according to the invention wherein the composition comprising fatty acids (i) provided in step a. is a reaction mixture in in which biodiesel feedstock has been reacted with a lipase to produce fatty acid alkyl esters, in particular until the reaction has substantially reached equilibrium.

The term "equilibrium" here may be defined as the point where there is no further net reduction of free fatty acids in the reaction mixture, or for example the reduction in FFA is so small that it does not pay off to allow the reaction to continue in the transesterification vessel.

Thus, the composition in i) may in particular be the reaction product from a transesterification reaction which has been allowed to proceed to a point where there is no further net reduction, or substantially no further net reduction of free fatty acids.

In some embodiments, the composition i) is a biodiesel feedstock which has been treated such that it has been incubated with a lipase and transesterified, as described e.g. in WO2017060471. After enzymatic transesterification, the heavy phase is decanted prior to entering the stepwise esterification process according to the present invention. See Discussion as well as FIG. 2.

Thus, one embodiment relates to the process according to the invention wherein the composition i) comprising free fatty acids provided in step a., is produced by a process comprising the steps:
 a.1—providing a biodiesel feedstock
 a.2—enzymatic transesterification by lipase of glycerides, and free fatty acids to fatty acid methyl esters
 a.3—separation of heavy phase from light phase
  whereby the composition i) comprises or consists of the light phase achieved in step a.3.

The lipase of step a.2 used to achieve the composition i) may be selected from the group consisting of *C. antarctica* lipase A as disclosed in WO 88/02775, *Thermomyces lanuginosus* lipase, *Thermomyces lanuginosus* (previously *Humicola lanuginosus*.) lipase variants exemplified in WO 00/60063, *Humicola insolens* cutinase variants disclosed in Example 2 of WO 01/92502, lipases from *Humicola lanuginosus* (EP 258 068), *Candida rugosa, Pseudomonas cepacia, Geotricum candidum, Rhizomucor miehei*, Crytococcus spp. S-2, *Candida parapsilosis*, Eversa Transform (Novozymes A/S), and Callera Trans (Novozymes A/S).

In particular embodiments, the lipase of step a.2 is selected from the group consisting of *Thermomyces lanuginosus* lipase and *Thermomyces lanuginosus* (previously *Humicola lanuginosus*.) lipase variants exemplified in WO 00/60063

In particular embodiments, the lipase of step a.2 is selected from the group consisting of Eversa Transform and Callera Trans.

FIG. 2 shows a system for transesterification followed by stepwise esterification and flashing. After the transesterification, water rich components may be mixed and flashed to reduce the water concentration prior to the reaction.

Thus, one embodiment relates to the process according to the invention wherein the composition i) comprising free fatty acids provided in step a, is produced by a process comprising the steps:
 a.1—providing a biodiesel feedstock
 a.2—enzymatic transesterification by lipase of glycerides and free fatty acids to fatty acid methyl esters
 a.3—separation of heavy phase from light phase
 a.4—drying (for example flash drying) of the light phase
  whereby the composition i) comprises or consists of the heavy phase achieved in step a.4.

As discussed, one advantage of the process according to the invention is that biodiesel feedstocks of low and/or varied quality can be used. Thus, in one embodiment the composition comprising free fatty acids i) or the biodiesel feedstock provided in step a.1, may be a biodiesel feedstock of low quality, such as one or more of used cooking oil, oil and fat refining waste, drainage oil, acidified oil, brown grease, sludge oil such as sludge palm oil, fatty acid distillates etc, or combinations thereof.

1.2 Step b—Mixing

The composition provided in step a. is mixed with esterase ii) glycerol iii) and short chain alcohol iv). These components ii)-iv) are required for the esterification reactions to take place in step c.

The mixing may be by any suitable means, the selection of which will be within the purview of a person with skill in the art.

1.2.1 ii) Esterase

The esterase ii) provided in step b is one or more esterase, such as one or more enzymes classified as EC 3.1.1 Carboxylic ester hydrolases according to Enzyme Nomenclature (Recommendations of the Nomenclature Committee of the International Union of Biochemistry and Molecular Biology, 1992 or later).

Some embodiments relate to the process according to the invention wherein the esterase ii) is selected from the group consisting of
  (a) a polypeptide comprising or consisting of the sequence *Candida* Santarctica Lipase B (as disclosed in WO 88/02775 and shown in SEQ ID NO:1 of WO2008065060), *Hyphozyma* sp. lipase (WO 98/018912), *Candida parapsilosis* lipase or combinations thereof.
  (b) a polypeptide which is a subsequence of the amino acid sequences set forth in (a);
  (c) a polypeptide having at least 60% sequence identity, such as e.g., at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, to any of the polypeptides defined in (a) and (b).

In particular, the esterase ii) may be an esterase having a sequence identity to the mature polypeptide of at least 60%, e.g., at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or even 100% sequence identity to the lipase B polypeptide from *Candida antarctica* (CALB) as disclosed in WO 88/02775.

In a preferred embodiment of the method of the present invention the esterase ii) of the present invention is lipase B from *Candida antarctica* (CALB) as disclosed in WO 88/02775.

For purposes of the present invention, the degree of identity may be suitably determined according to the method described in Needleman, S. B. and Wunsch, CD., (1970), Journal of Molecular Biology, 48, 443-45, with the following settings for polypeptide sequence comparison: GAP creation penalty of 3.0 and GAP extension penalty of 0.1. The determination may be done by means of a computer program known such as GAP provided in the GCG program package (Program Manual for the Wisconsin Package, Version 8, August 1994, Genetics Computer Group, 575 Science Drive, Madison, Wisconsin, USA 53711). Two given sequences can be aligned according to the method described in Needleman (supra) using the same parameters. This may be done by means of the GAP program (supra).

Commercial esterase preparations suitable for use in step b of the process of the invention include LIPOZYME CALB L, and NS88007 available from Novozymes A/S.

CALB retains activity also at low water concentrations.

Thus, one embodiment relates to the process according to the invention wherein the esterase is an esterase which is active at low water activity; or in other words displays an activity at low water concentrations which is similar to that of CALB., such as in the range of from 60 to 100% of CALB activity as determined by comparative studies, for example from 70 to 100%, 75 to 100%, 80 to 100%, 85 to 100%, 90 to 100%, 95 to 100%.

Thus, one embodiment relates to the process according to the invention wherein the esterase displays a rate of esterification at 500 ppm water, which is in the range of from 60 to 100% of CALB activity at 500 ppm water as determined by comparative studies, for example from 70 to 100%, 75 to 100%, 80 to 100%, 85 to 100%, 90 to 100%, 95 to 100%.

The activity of CALB may be determined as the rate of esterification, see Materials and Methods and Example 3.

Sequence identity to CALB may be taken to be an indication of the similar activity at low water concentrations.

Particular embodiments relate to the process according to the invention wherein the esterase ii) is CALB.

In one embodiment, the invention relates to the use of an esterase ii), such as an esterase which displays a activity at low water concentrations which is similar to that of CALB., such as in the range of from 60 to 100% of CALB stability as determined by comparative studies, for ex-ample from 70 to 100%, 75 to 100%, 80 to 100%, 85 to 100%, 90 to 100%, 95 to 100%.

In a further embodiment, the invention relates to the use of CALB in the process according to the invention.

The present invention relates in a second aspect to the use of an esterase ii) in a process according to the invention.

One embodiment of this second aspect, relates to the use of CALB in a process according to the invention.

The considerations and embodiments presented in context of the first aspect of the invention are applicable also to this second aspect of the invention, q.v..

The amount of esterase added may be in the range from 0.05% to 8 wt % based on weight of the composition i), such as in the range of from 0.05 to 7 wt %, 0.05 to 6 wt %, 0.05 to 5 wt %, 0.05 to 5 wt %, 0.05 to 4 wt %, 0.05 to 3 wt %, 0.05 to 2 wt %, 0.05 to 1.5 wt %; based on composition i).

Esterase Formulation

The term "esterase" is used herein to refer to the enzyme which catalyzes esterification of FFA to fatty acid methyl esters.

The esterase ii) may be provided in any suitable formulation, such as lyophilized powder, immobilized or in aqueous/liquid solution. In one embodiment, the esterase is provided as a dry formulation, such as e.g. spray dried, or granulated. If the esterase is provided as a dry formulation, the esterase will be dissolved/suspended in aqueous/liquid solution such that the incubation (step c.) takes place in liquid.

In another embodiment the esterase is provided in a liquid formulation. That is, the esterase is not immobilized on a carrier, but is present in an aqueous formulation. This represents a cost-savings as liquid formulation enzymes are simpler to produce and therefore cheaper.

Immobilized enzymes, such as Novozym 435, are bound to solid particles, facilitating recovery from reaction mixture and enabling re-use in process. However, the recovery and re-use of immobilized enzyme necessitates additional process steps such filtration. Additionally, small particles might cause fouling or damage to instrumentation lowering the profitability of the process.

Furthermore, the immobilized enzymes themselves are costlier due to the immobilization.

The present invention presents a surprising method for re-use of liquid formulation enzymes, leading to reducing the cost/increasing the process efficiency of use of liquid formulation enzymes.

While the use of esterase in liquid formulation presents advantages, nonetheless if desired, immobilized esterase may be employed.

One particular embodiment relates to the process according to the invention wherein the esterase iii) comprises or consists of CaIB in liquid formulation.

Providing the esterase as a liquid has the disadvantage of introducing water into the system (which would shift the equilibrium away from biodiesel production). However, the inventors have surprisingly found that glycerol caused a significant shift of equilibrium towards an increased conversion of FFA, mitigating the effect of water introduction (see Example 2).

Additionally, the enzyme was is recoverable through isolation of the heavy glycerol phase, in which the enzyme resides, see further 1.10 Separation.

1.2.2 iii)—Glycerol

Glycerol iii) is added and mixed in step b.

In the esterification reaction glycerol is produced. Adding glycerol may drive the esterification reaction in the direction favorable to production of biodiesel, which is why glycerol is added in the process of the invention.

The selection of glycerol (e.g. degree of dryness etc.) to be added in step b. will be within the purview of the person with skill in the field.

Without wishing to be bound by theory, it is believed that the heavy glycerol phase then acts as enzyme carrier and lowering the water activity, with CALB acting at the phase boundary or interphase between glycerol and FAME.

Additionally, as will be presented, the enzyme was found recoverable through isolation of the heavy glycerol phase, in which the enzyme resides. This is may be accomplished through decanting.

Particular embodiments relate to the process according to the invention wherein in step b. glycerol iii) is added in an amount in the range from 3 to 12 wt %, such as 3 to 11 wt %, for example 3 to 10 wt % such as 3 to 9 wt %, for example 3 to 8 wt %, such as 3 to 7 wt %, for example 3 to 6 wt %; or for example 4 to 9 wt %, such as 4 to 8 wt %, for example 4 to 6 wt %, such as about 5 wt % based on composition i).

1.2.3 iv) Short Chain Alcohol

The term short chain alcohols is used herein to mean one or more of methanol, ethanol, propanol, or butanol.

The main short chain fatty acid esters which can be used as biodiesel are fatty acid methyl esters (FAME) and fatty acid ethyl esters (FAEE).

Thus, in particular embodiments, the invention relates to the process according to the invention wherein the one or more short chain alcohol iv) of step b. is methanol and/or ethanol, preferably methanol.

In some embodiments relate to the process according to the invention wherein in step b. the short chain alcohol iv) (e.g. methanol and/or ethanol, in particular methanol), is added in an amount in the range from 2 to 12 wt %, such as 3 to 11 wt %, for example 3 to 10 wt % such as 3 to 9 wt %, for example 3 to 8 wt %, such as 3 to 7 wt %, for example 3 to 6 wt %; or for example 4 to 9 wt %, such as 4 to 8 wt %, for example 4 to 7 wt % based on composition i)

1.3 Step c.—Incubation

The process of the invention comprises a step c. of incubating the mixture of Step b such that the esterase catalysis esterification of free fatty acids.

The selection of conditions suitable for the incubation of step c. will be clear to the skilled person in the field. The parameters may depend for example on the selected enzyme(s) and their temperature sensitivity, the quality of the biodiesel feedstock at starting point and the desired quality of the final product.

Some embodiments relate to the process according to the invention wherein said incubation is at a temperature in the range of from 30 to 60° C., such as from 30 to 55° C., such as 45 to 55° C., 50 to 55° C.; or for example in the range of from 30 to 65° C., or 30 to 50° C., or 40-50° C.

Some embodiments relate to the process according to the invention wherein said incubation is for a time period sufficient to ensure a reduction of free fatty acids by at least 20% such as at least 30%, at least 40%, at least 50%, at least 60% or at least 75%.

Some embodiments relate to the process according to the invention wherein said incubation is for a time period in the range of from 2 to 24 hr, such as from 2 to 24 hours, 5 to 24 hrs, 6 to 24 hrs, 10 to 24 hrs.

1.4 Step d.—Flash Drying

The process of the invention comprises a step d. of flash drying the incubated mixture resulting from step c.

As mentioned previously, the esterification reaction produces water and the presence of water at a certain level hinders the reaction from proceeding further in the direction of biodiesel production. Removing water will shift the equilibrium and favour the further production of biodiesel.

Thus, it is desirable to remove water from the reaction product mixture (incubated mixture resulting from step c.

Surprisingly, it has been found that the total reaction mixture containing reaction products from lipase treatment of the biodiesel feedstock, glycerol, water, and liquid formulated lipase can be dried in a flash system to provide water content low enough for reaching a high degree of esterification of the FFA.

Flash drying is a conventional technique for drying biodiesel based on the discrepancy of boiling points for the heavy and light phases of the biodiesel reaction.

The conditions for the flash-drying are selected such that the esterase ii) can be re-used.

In other words, the conditions for the flash-drying are selected such that the esterase ii) retains at least partial activity. The conditions for flash-drying may be selected such that the esterase ii) is not fully denatured and/or not fully inactivated.

In some embodiments of the present invention, said flash drying of step d. is performed at a temperature in the range of from 40 to 75° C., such as 45 to 75° C., 50 to 75° C., 55 to 75° C.; or for example in the range of from 40 to 65° C., 40 to 60° C., 40 to 55° C. or 40 to 50° C.;

Particular embodiments of the present invention, said flash drying of step d. is performed at a temperature in the range of from 45 to 70° C., 45 to 65° C., 50 to 60° C.

It can be difficult to ascertain the temperature inside the flash drying chamber, and therefore the temperature may be measured at inlet point.

Thus, some embodiments of the present invention relate to where the flash drying of step d. is performed at a temperature range as mentioned above, wherein the temperature is measured at inlet point.

Some embodiments relate to the process according to the invention wherein said flash drying of step d. is performed at a pressure in the range of from less than 250 mbar, such as less than 200 mbar, or less than 150 mbar; or for example in the range of from 80 mbar to 250 mbar, such as from 100 mbar to 220 mbar, e.g. 100 mbar to 200 mbar, such as from 120 mbar to 180 mbar, such as about 150 mbar.

The conditions of the flash drying are dependent both on the selected temperature, pressure, and time. Thus, some embodiments relate to the process according to the invention wherein said flash drying of step d. is performed at a pressure in the range of from 80 to 250 mbar and a temperature in the range of from 40 to 75° C.; for example pressure in the range of from 80 to 220 mbar and a temperature in the range of from 45 to 70° C.; such as pressure in the range of from 80 to 200 mbar and a temperature in the range of from 45 to 70° C.; for example pressure in the range of from 100 to 200 mbar and a temperature in the range of from 45 to 65° C.; such as pressure in the range of from 100 to 200 mbar and a temperature in the range of from 50 to 60° C.

In some embodiments the flash drying is performed at pressure in the range of from 100 to 200 mbar and a temperature in the range of from 50 to 60° C.; for example, pressure in the range of from 140 to 160 mbar and a temperature in the range of from 50 to 60° C., such as a pressure of about 150 mbar and a temperature of about 55° C.

In some embodiments the esterase ii) in step a. is *Candida Antarctica* Lipase B (CALB), and the flash drying is performed at pressure in the range of from 100 to 200 mbar and a temperature in the range of from 50 to 60° C.; for example pressure in the range of from 140 to 160 mbar and a temperature in the range of from 50 to 60° C., such as a pressure of about 150 mbar and a temperature of about 55° C.

Some embodiments relate to the process according to the invention wherein said flash drying of step d. is performed for a time in the range of from 1 to 100 minutes (mins), such as 1 to 60 mins, for example 1 to 25 mins, such as 1 to 20 mins; or for example 5 to 50 mins, such as 5 to 20 mins; or for example 10 to 20 mins.

In some embodiments the flash drying is performed at pressure in the range of from 100 to 200 mbar, a temperature in the range of from 50 to 60° C. and a time in the range of from 1 to 60 mins; or for example pressure in the range of from 140 to 160 mbar, a temperature in the range of from 50 to 60° C., and a time in the range of from 1 to 25 mins; or for example a pressure of about 150 mbar, a temperature of about 55° C. and a time in the range of about 15 mins.

In particular some embodiments the esterase ii) in step a. is *Candida Antarctica* Lipase B (CALB) and the flash drying is performed at pressure in the range of from 100 to 200 mbar, a temperature in the range of from 50 to 60° C. and a time in the range of from 1 to 60 mins; or for example pressure in the range of from 140 to 160 mbar, a temperature in the range of from 50 to 60° C., and a time in the range of from 1 to 25 mins; or for example a pressure of about 150 mbar, a temperature of about 55° C. and a time in the range of about 15 mins.

The flash drying of step d. leads to a reduction in the amount of water, which is favourable for the reaction as mentioned above.

Thus, some embodiments relate to the process according to the invention wherein the flash-dried mixture obtained in step d. has a water content in the range from 0-700 ppm, such as from 50-600 ppm, 50 to 500 ppm, 50 to 400 ppm, 50 to 300 ppm; or for example 55 to 500 ppm, such as 60 to 600 ppm, 70 to 600 ppm, 100 to 600 ppm, 200 to 600 ppm.

In some embodiments the flash drying is performed at pressure in the range of from 100 to 200 mbar, a temperature in the range of from 50 to 60° C., a time in the range of from 1 to 60 mins and the flash-dried mixture obtained in step d. has a water content in the range from 50 to 600 ppm; or for example pressure in the range of from 140 to 160 mbar, a temperature in the range of from 50 to 60° C., a time in the range of from 1 to 25 mins and the flash-dried mixture obtained in step d. has a water content in the range from 50 to 500 ppm; or for example a pressure of about 150 mbar, a temperature of about 55° C., a time in the range of about 15 mins and the flash-dried mixture obtained in step d. has a water content in the range from 50 to 400 ppm.

In particular embodiments the esterase ii) in step a. is *Candida Antarctica* Lipase B (CALB) and the flash drying is performed at pressure in the range of from 100 to 200 mbar, a temperature in the range of from 50 to 60° C., a time in the range of from 1 to 60 mins and the flash-dried mixture obtained in step d. has a water content in the range from 50 to 600 ppm; or for example pressure in the range of from 140 to 160 mbar, a temperature in the range of from 50 to 60° C., a time in the range of from 1 to 25 mins and the flash-dried mixture obtained in step d. has a water content in the range from 50 to 500 ppm; or for example a pressure of about 150 mbar, a temperature of about 55° C., a time in the range of about 15 mins and the flash-dried mixture obtained in step d. has a water content in the range from 50 to 400 ppm.

The process according to the invention relates to a flash-drying process wherein the flash drying is done under conditions which do not denature the esterase. In other words, the esterase ii) retains at least partial activity after the flash drying of step d., for example the esterase ii) retains at least 40% of its activity.

Thus, the invention relates to a process according to the invention wherein step d. is:

d. flash drying the incubated mixture resulting from step c., wherein the flash drying is done under conditions such that the esterase ii) which has been flash-dried retained at least 40% of its activity;

Thus, some embodiments relate to the process according to the invention wherein the esterase ii) which has been flash-dried retains at least 40% of its activity, such as at least 50%, such as at least 55%, at least 60%, at least 65%, at least 70%, at least 75%, at least 80%, at least 85%, at least 90% of its activity.

The process according to claim 1, wherein the flash drying of step d. is done under conditions such that the esterase ii) which has been flash-dried retained at least 40% of its activity, such as at least 50%, such as at least 55%, at least 60%, at least 65%, at least 70%, at least 75%, at least 80%, at least 85%, at least 90% of its activity.

The amount of activity retained may be determined by determining the rate of esterification for enzyme prior to flash drying, and comparing this to the rate of esterification for enzyme after being subjected to flash drying. The rate of esterification may be determined by methods described in Materials and Methods and Example 3.

A person skilled in the art of flash drying will recognize that the efficiency of drying can be improved e.g. in the following two ways: 1) let a second flash dryer operate immediately after first flash dryer, 2) establish a loop from the dryer that re-cycles a part of the flash outlet stream and mixes it into the inlet stream, making for instance 60% re-cycle of the outlet stream.

Thus, some embodiments relate to the process according to the invention wherein the flash drying of step d. is immediately followed by a second flash drying Further particular embodiments of the invention relate to a process for enzymatic esterification of free fatty acids, comprising the steps of:
a. providing a composition comprising free fatty acids i),
b. adding to the composition provided in step a.:
    ii) esterase,
    iii) glycerol, and
    iv) short chain alcohol
        and mixing
c. incubating the mixture of step b such that the esterase catalyses esterification of free fatty acids,
d. flash drying the incubated mixture resulting from step c., optionally immediately followed by one or more further flash drying steps,
e. optionally mixing the flash-dried mixture obtained in step d. with further short chain alcohol v)
f. incubating the mixture obtained in step e., whereby the esterase ii) provided in step b catalyses esterification of free fatty acids.

Further particular embodiments relate to the invention according to the invention step d. flash drying the incubated mixture resulting from step c., optionally immediately followed by one or more further flash dryings, such as at least one further flash drying, for example one further flash drying, e.g. 2, 3, 4 further flash dryings. The further flash drying in step d. are performed as described above in heading 1.4.

One of the advantages of the invention lie in that the flash-drying step can be performed on the reaction mixture, without need for separation.

Thus, particular embodiments relate to the process according to the invention wherein the mixture from step c. is not separated prior to the flash drying step of step d. Separated here means the separation of light phase from heavy phase.

1.5 Step e. and f.—Mixing with Further Short Chain Alcohol

The flash drying according to the invention both provides the conditions which permit esterification reaction to continue further (i.e., reduces water content) as well as leaving the enzyme still active and thus able to be re-used.

This re-use of the esterase leads to substantial gains in profitability. Furthermore, the re-use of esterase in the process according to the invention employs a simple set up avoiding problems associated for example with recovery and reuse of immobilized enzyme (e.g. fouling).

Thus, the process of the invention comprises a step e. of optionally mixing the flash dried mixture obtained in step d. with further short chain alcohol (for example methanol and/or ethanol, in particular methanol), and a step f. of incubating the mixture obtained in step e., whereby the esterase ii) provided in step b catalyses esterification of free fatty acids.

In those cases where no further short chain alcohol is added and mixed, then step f. relates to incubating the mixture obtained in step d.

Thus, particular embodiments relate to the process according to the invention wherein the composition achieved in step f. or f.n has a free fatty acid content of less than 5 wt %, such as less than 3 wt %, less than 0.5 wt %, or less than 0.25 wt %; for example in the range of from 0.02 wt % to 5 wt %, for example 0.02 wt % to 3 wt %, such as 0.02 wt % to 2 wt %, 0.02 wt % to 1 wt %.

The short chain alcohol is added to the same amount as described for step b.

This re-use of the esterase present in the flash-dried mixture is one level of enzyme recycling which the present invention makes possible.

1.6 R1 Flash Drying Loop

The esterase present in the reaction mixture retains activity despite having been subjected to an intervening flash drying as described in step d., and therefore can be re-used several times.

Thus, one embodiment relates to the process according to the invention wherein the esterase is reused in the range of from 1 to 10 times, for example 1 to 8 times, such as 1 to 6 times, or for example 1 to 5 times.

The reuse of the esterase may alternatively be described in the manner that the flash drying step as described in step d. may be repeated as desired, effectively inserting a flash drying loop in the process (see FIG. 1, R1). This means that the enzyme reaction mixture achieved in step f. may be subjected to a further flash drying step d.1 performed as described in step d., optionally followed by a step e.1 of addition of further short chain alcohol v) performed as described for step e, and to a step f.1 performed as described for step f.

Thus, in one embodiment the process according to the invention further comprises the steps
    d.1—flash drying the incubated mixture resulting from step f.,
    e.1—optionally mixing the flash-dried mixture obtained in step d.1 with further short chain alcohol v), and
    f.1—incubating the mixture obtained in step e.1 whereby the esterase ii) provided in step b catalyses esterification of free fatty acids.

In a further embodiment the process according to the invention further comprises the steps
    d.1—flash drying the incubated mixture resulting from step f., wherein the flash drying done under conditions such that the esterase ii) which has been flash-dried retained at least 40% of its activity
    e.1—optionally mixing the flash-dried mixture obtained in step d.1 with further short chain alcohol v), and
    f.1—incubating the mixture obtained in step e.1 whereby the esterase ii) provided in step b catalyses esterification of free fatty acids As will be understood, this flash drying loop comprising the steps of d.n, e.n and f.n, where n denotes the number of times the enzyme is reused, and may be performed as many times as needed. The flash drying step of d.n is performed on the incubated mixture resulting from step f.(n-1). The steps d.n, e.n and f.n are performed in a manner as described for steps d, e and f respectively (see corresponding headings for descriptions).

In particular embodiments, the process according to the invention relates to where n is in the range of from 1 to 10, such as 1 to 9, for example 1 to 8, 1 to 7, 1 to 6 or for example 1 to 5.

In particular embodiments, the invention according to the invention further comprises the steps of d.1, e.1, f.1; followed by steps d.2, e.2 f.2; d.3, e.3, f.3, d.4, e.4, f.4, and d.5, e.5 and f.5.

In particular embodiments, the invention according to the invention further comprises the steps of d.1, e.1, f.1; followed by steps d.2, e.2 f.2; d.3, e.3, f.3, and d.4, e.4, f.4.

In particular embodiments, the invention according to the invention further comprises the steps of d.1, e.1, f.1; followed by steps d.2, e.2 f.2; and d.3, e.3, f.3.

The reaction results of FIG. 7 (flash step reactions) suggest only 2 esterification steps would be required. Thus, in particular embodiments, the invention according to the invention further comprises the steps of d.1, e.1, f.1; followed by steps d.2, e.2 f.2.

Particular embodiments relate to the invention according to the invention comprising the steps of:
a. providing a composition comprising free fatty acids i),
b. adding to the composition provided in step a.:
   ii) esterase,
   iii) glycerol, and
   iv) short chain alcohol
      and mixing
c. incubating the mixture of step b such that the esterase catalyses esterification of free fatty acids,
d. flash drying the incubated mixture resulting from step c.,
e. optionally mixing the flash-dried mixture obtained in step d. with further short chain alcohol v)
f. incubating the mixture obtained in step e., whereby the esterase ii) provided in step b catalyses esterification of free fatty acids,
d.1—flash drying the incubated mixture resulting from step f., wherein the flash drying is done under conditions which do not denature the esterase
e.1—optionally mixing the flash-dried mixture obtained in step d.1 with further short chain alcohol v), and
f.1—incubating the mixture obtained in step e.1 whereby the esterase ii) provided in step b catalyses esterification of free fatty acids;
d.2-flash drying the incubated mixture resulting from step f.1 wherein the flash drying is done under conditions which do not denature the esterase
e.2—optionally mixing the flash-dried mixture obtained in step d.2 with further short chain alcohol v), and
f.2—incubating the mixture obtained in step e.2 whereby the esterase ii) provided in step b catalyses esterification of free fatty acids,
g. separating the mixture obtained in step f.2, into a
   vi) light phase, comprising fatty acid methyl ester and
   vii) a heavy phase, comprising esterase, glycerol and short chain alcohol.
h. drying the light phase (vii) achieved by the separation of step g.
i. wherein the heavy phase (vii) from step g. is recycled and added back to the process at step b, thereby supplementing one or more of ii) esterase, iii) glycerol and iv) short chain alcohol Further particular embodiments relate to the invention according to the invention comprising the steps of:
a. providing a composition comprising free fatty acids i), wherein said composition i) is produced by a process comprising the steps:
   a.1—providing a biodiesel feedstock
   a.2—enzymatic transesterification by lipase of glycerides and free fatty acids to fatty acid methyl esters
   a.3—separation of heavy phase from light phase, whereby the composition i) comprises or consists of the light phase achieved in
   step a.3
b. adding to the composition provided in step a.:
   ii) esterase,
   iii) glycerol, and
   iv) short chain alcohol
      and mixing
c. incubating the mixture of step b. such that the esterase catalyses esterification of free fatty acids,
d. flash drying the incubated mixture resulting from step c.,
e. optionally mixing the flash-dried mixture obtained in step d. with further short chain alcohol v)
f. incubating the mixture obtained in step e., whereby the esterase (ii) provided in step b. catalyses esterification of free fatty acids,
d.1—flash drying the incubated mixture resulting from step f., wherein the flash drying is done under conditions which do not denature the esterase
e.1—optionally mixing the flash-dried mixture obtained in step d.1 with further short chain alcohol v), and
f.1—incubating the mixture obtained in step e.1 whereby the esterase (ii) provided in step b. catalyses esterification of free fatty acids;
d.2-flash drying the incubated mixture resulting from step f.1, wherein the flash drying is done under conditions which do not denature the esterase
e.2—optionally mixing the flash-dried mixture obtained in step d.2 with further short chain alcohol v), and
f.2—incubating the mixture obtained in step e.2 whereby the esterase (ii) provided in step b. catalyses esterification of free fatty acids,
g. separating the mixture obtained in step f.2, into a
   vi) light phase, comprising fatty acid methyl ester and
   vii) a heavy phase, comprising esterase, glycerol and short chain alcohol.
h. drying the light phase (vii) achieved by the separation of step g.
i. wherein the heavy phase (vii) from step g. is recycled and added back to the process at step b., thereby supplementing one or more of ii) esterase, iii) glycerol and iv) short chain alcohol.

1.7 Step g.—Separation

The method according to the invention may further comprise a separation step. Thus, one embodiment of the invention relates to the process according to the invention, further comprising a step g. separating the mixture obtained in a step f., into a vi) light phase, comprising fatty acid methyl ester and vii) a heavy phase, comprising esterase, glycerol and short chain alcohol.

In the embodiments comprising a step f.n (such as f1, f.2, f.3, f.4, f.5, see herein above), the separation step g. relates to separating the mixture obtained in the final step f.n.

This separation step may be performed in any suitable manner, such as gravity settling, centrifugation and/or decanting. The selection of the separation method is within the purview of a person skilled in the field.

In one preferred embodiment, the separation step g. is decanting.

1.8—vii) Heavy (Glycerol and Esterase) Phase

The separation step of g. leads to a vii) heavy phase, comprising esterase, glycerol and short chain alcohol. The esterase present in this phase will still retain activity, and thus may be re-used further.

The components glycerol and short chain alcohol are also used in the esterification reaction in step b. As such, the heavy phase vii) is a source of components ii) esterase, iii) glycerol and iv) short chain alcohol, and recycling of the heavy phase leads to increased efficiency of process and profitability gains.

Thus, one embodiment of the invention relates to a process according to the invention further comprising the step i. wherein the heavy phase vii) from step g. is recycled and added back to the process at step b., thereby supplementing one or more of ii) esterase, iii) glycerol and iv) short chain alcohol provided in step b. (see FIG. 1, indicated by R2).

This is the second level of recycling which the process of the present invention may provide.

1.9—vi) Light (FAME or Biodiesel) Phase

The separation step of g. leads to a vi) light phase, comprising biodiesel (FAME).

Some embodiments of the invention relate to the process according to invention wherein, the light phase vi) achieved in step g. has a free fatty acid content of less than 5 wt %, less than 3 wt %, less than 0.5 wt %, such as less than 3 wt %, less than 0.5 wt %, or less than 0.25 wt %; for example in the range of from 0.02 wt % to 5 wt %, for example 0.02 wt % to 3 wt %, such as 0.02 wt % to 2 wt %, 0.02 wt % to 1 wt %.

1.10 One-Step Flash Drying

In some cases, it may be desirable to further dry and/or work up the light phase vi) achieved in step g.

Thus, one embodiment of the process of the invention further comprises a step h. of drying, for example flash-drying, the light phase vii) achieved by the separation of step g.

This further flash-drying step is also referred to herein as one-step flash drying to distinguish from the flash dryings of step d. and step d.n. This one-step flash-drying may be done at any temperature/pressure/time suitable to achieve the desired level of dryness, and to secure full short chain alcohol evaporation. At this point, as there is no esterase present, there is no need to adjust the parameters of flash-drying in order to ensure that enzyme activity is retained. Alternatively, the further drying may be achieved by any other suitable drying process, the selection of which is within the purview of the person skilled in the field.

Some embodiments of the invention relate to the process according to invention wherein, the light phase vi) achieved in step g. has a free fatty acid content after one-step flash drying of less than 5 wt %, less than 3 wt %, less than 0.5 wt %, such as less than 3 wt %, less than 0.5 wt %, or less than 0.25 wt %; for example in the range of from 0.02 wt % to 5 wt %, for example 0.02 wt % to 3 wt %, such as 0.02 wt % to 2 wt %, 0.02 wt % to 1 wt %.

1.11 Optional Caustic Wash

The process according to the invention will results in a biodiesel with low levels of free fatty acids. Avoiding caustic wash yields advantages. When employed, caustic wash may lead to a portion of the FAME being trapped when separating the soap, thereby reducing yield. The recycled soap is acidified yielding FFA. This acidification is done using sulphuric acid, increasing the overall cost. FFA esterification according to the present method would avoid this cost. The present method increases the productivity and results in smaller or no soap recycle stream, which reduces waste production.

Thus, one embodiment relates to the process according to the invention wherein the process does not comprise a step of caustic washing.

However, some cases, it may be desirable to further reduce the free fatty acid content of the light phase vi) achieved in step g.

Thus, one embodiment of the process according to the invention further comprises a step j. of caustic washing.

Caustic washing is a well-known process in the art and selection of parameters is within the purview of the person skilled in the field.

A caustic washing step may also be employed for for removal of sulphuric compounds and other impurities, such as glycerides, and might be useful regardless of FFA concentration.

1.12 Optional Glycerol Reduction

The presence of glycerol in the heavy phase may shift the equilibrium of the transesterification reaction towards formation of glycerides rather than FAME. We examined this and found a slight increase in glyceride levels during single step reaction without drying from 0.05 wt % total glycerin in B100 biodiesel to 0.25 wt % at equilibrium in reactions running with a loading of 5% (w/w of FAME) glycerol. This is the precise glycerin limit according to biodiesel specifications (European Standard), but stems primarily from formation of monoglycerides, which increased from 0.24 to 0.61 wt %, and glycerol, which increased from an immeasurably low value (near zero) to 0.09 wt %. Both were measured using the QTA method. In particular, the glycerol is easily reduced in subsequent downstream processing, resulting in FAME within the biodiesel specification.

1.13 Batch or Continuous Process

Further, the invention relates to a batch process and/or a continuous, staged process to produce fatty acid alkyl esters, wherein the alcohol is added continuously or stepwise, and wherein the enzymes are recycled or used only once. If the enzymes are in an aqueous phase, this phase can be separated from the fatty phase by a decanter, a settler or by centrifugation. In the continuously process the two phases, oil and aqueous, respectively, can be processed countercurrently.

1.14 Use of CalB

The present invention relates in a second aspect to the use of CALB in a process according to the invention. The discussion of parameters relating to the previous aspects of the invention are applicable also to this second aspect of the invention, q.v.

1.15 Flash Drying Method

The present invention is based on the surprising discovery that it is possible to dry (remove water) from a reaction mixture comprising FAME, free fatty acids, esterase, glycerol, short chain alcohol and water in a flash dryer under conditions which do denature the esterase. This makes possible the re-use of the esterase.

Thus, a third aspect of the invention relates to a process for flash drying of a mixture comprising free fatty acids, said mixture comprising FAME, free fatty acids, esterase, glycerol, short chain alcohol and water; and said process comprising the steps of providing said mixture and subsequently flash drying said mixture wherein the flash drying is done under conditions which do not denature the esterase.

The discussion of parameters relating to the previous aspects of the invention, are applicable also to this third aspect of the invention, q.v.

Advantages

The present invention provides at least the following advantages:

Process economy benefits coming from re-use of the reaction mixture, including re-use of the enzyme, recycling of glycerol, and/or the recycling of short chain alcohol The flash-drying process enables enzyme reaction to proceed further towards the production of fame, increasing yield of FAME This improved economy in turn leads to that FFA feedstock not previously able to be used can now come into consideration.

A further benefit is a simple process layout based on conventional engineering unit operations that can be used with lower cost liquid lipase formulation.

EXAMPLES

Materials and Methods

The esterification reaction mixtures varied in scale, and either 30, 300 or 450 g crude FAME (B100 biodiesel (Acidity equivalent to ~0.2 wt % FFA) stemming from palm oil with oleic acid added, essentially removing significant presence of acidity stemming from sources other than FFA) was reacted. In the full factorial design results used to show the significance of glycerol, methanol and enzyme, crude palm oil methyl ester (FAME), stemming from palm oil, was used.

- 30 g scale experiments were conducted in 150 mL square flasks (DURAN).
- 300 g scale experiments were conducted in centrifuge tubes (Polycarbonate, 500 mL, 69×160, Beckman Coulter Life Sciences), Both were run in a shaking incubator oven (New Brunswick Scientific™ Innova$^T$M 44 Incubator Shaker) at 250 rpm and at 40° C.

Glycerol loadings of 5% (w/w of crude FAME) were generally used. Methanol and enzyme loadings varied, and loadings will from here on be stated in % (w/w of crude FAME).

Reaction mixtures with crude FAME, glycerol, and methanol were preheated to 40° C. Enzyme was added at t=0, and reaction progression was monitored through 1-2 mL samples, which were taken and heated to 100° C. for 10 minutes followed by 2 minutes of centrifugation to separate the phases.

Thermal deactivation of enzyme was measured following the normal procedure, although 15 minutes of incubation at the stated temperatures was used with appropriate preheating and quick cooling, along with the addition of oleic acid to 10 wt % FFA prior to the t=0 sample.

Samples were analyzed for acidity in the FAME phase using the AOCS method calculated as oleic acid (AOCS, 2017a). Methanol and glycerides were measured using the Medium Infrared System (Bruker Tensor II) supported by the Eurofins Quality Trait Analysis (QTA) calibration service according to AOCS specification (AOCS, 2017b). Water content was measured using Karl Fischer titration (831 KF Coulometer with 774 Oven Sample Processor) and calculated through component mass balances.

Flash column VLLE calculations were done computationally utilizing the UNIFAC thermodynamic model (Fredenslund et al. 1975) in Pro/II.

Materials

Glycerol and methanol were of analytical grade with purity >99.5%. Glycerol water concentration=1000 ppm, methanol water concentration=200 ppm. Oleic acid was of technical grade with purity >90%, with the remainder being mainly other fatty acids. The enzyme used was CALB (NS88007, Novozymes, Bagsvaerd, Denmark, (containing 43.7 wt % water).

Example 1

An experiment was done mimicking flash distillation using the rotary evaporator. This was done with a liquid enzyme system using 30 g crude FAME with 0.8% (w/w of crude FAME) Lipozyme CALB L, 6% (w/w of crude FAME) methanol and 5% (w/w of crude FAME) glycerol.

30 g of FAME was transferred to the reaction flask and mixed with methanol. The FAME/methanol mixture was preheated to 40° C. prior to adding the enzyme.

Reactions were run in 2000 mL drying flasks (Büchi) connected to the rotary evaporator (Rotary evaporator, model R-124—Büchi). Mixing was done by the rotation of the rotary evaporator apparatus, which was set at 100 rpm.

Reaction was allowed to run for 20, 24 and 76 hours while flashing for 30 minutes at full vacuum (1-4 mbar after 5 minutes) in between. After each flash, another 6% (w/w of crude FAME) methanol was added. Samples of 2 mL of reaction mixture was transferred to 2 mL Eppendorf tubes, with safelock, and incubated for 10 min at 99° C. in a thermoblock (Eppendorf Thermo-mixer comfort, 5355 32447, Eppendorf Germany), in order to inactivate the enzyme. The sample was centrifuged at 6000 rpm for 2 min (Mini Centrifuge,C1413V-230, VWR International, United States) and stored at 5° C. Samples were then assumed to be stable.

The pressure was lowered at set intervals, resembling a flash column. The temperature was kept at 40° C. during the flashing procedure. The results are seen in FIG. 5.

It can be seen that levels of free fatty acids are reduced.

Example 2: Estimated Linear Model Parameters and their Statistical Significance for Prediction of Equilibrium FFA in Wt %

The contribution of glycerol to equilibrium was studied in a full factorial experiment with three center points. Reactions were conducted in 30 g scale on crude FAME. Initial FFA concentration in the FAME was 2.9 wt %, with minimum FFA measured after reaction being 1.3 wt %. Total water concentrations range from 1700 ppm at 0.3% (w/w of FAME) enzyme to 3600 ppm at 0.8% enzyme. Glycerol and methanol have negligible impact on the total water concentration.

TABLE 1

Parameters and results.

| Glycerol wt % | Methanol wt % | Enzyme wt % | FFA Eq 1 day wt % |
|---|---|---|---|
| 0.5 | 2 | 0.3 | 2.633 |
| 0.5 | 6 | 0.3 | 2.11 |
| 5 | 6 | 0.3 | 1.433 |
| 5 | 2 | 0.3 | 1.624 |
| 2.75 | 4 | 0.55 | 1.966 |
| 2.75 | 4 | 0.55 | 1.876 |
| 2.75 | 4 | 0.55 | 2.013 |
| 5 | 6 | 0.8 | 1.775 |
| 0.5 | 6 | 0.8 | 2.498 |
| 5 | 2 | 0.8 | 2.308 |
| 0.5 | 2 | 0.8 | 3.697 |

TABLE 2

Estimated linear model parameters and their statistical significance for prediction of equilibrium FFA in wt %. Loading ranges stated in % (w/w of FAME).

| Factor | Estimate | p-value |
|---|---|---|
| Intercept | 2.686 | <0.0001 |
| Glycerol (0.5-5 [%]) | −0.211 | 0.0016 |
| Methanol (2-6 [%]) | −0.153 | 0.0148 |
| Enzyme (0.3-0.8 [%]) | 1.239 | 0.0140 |

As expected, increased methanol dosage resulted in higher conversion of FFA to FAME. For the enzyme dosage, the FFA content at equilibrium was found to decrease which is ascribed to the amount of water added with the higher enzyme dosage.

Table 2 shows a linearized model obtained from a study conducted in 30 g scale experiments using crude FAME. It shows significant impact of glycerol upon the resulting FFA concentration in the FAME phase at equilibrium. Glycerol loadings of 10% were also tested.

Glycerol is currently thought to impact the equilibrium through reduction of the apparent water concentration experienced by the enzyme in its active site. The active site and its opening will point towards the hydrophobic phase and might not experience the water present in the hydrophilic glycerol phase. Additionally, glycerol was found to be important for the activity of the enzyme, attributed to the formation of the phase interface upon which the enzyme acts. See Table 2 where a significant effect of glycerol and the factor −0.211 shows lower FFA for higher glycerol in the range 0.5-5%.

Example 3: Esterase and Glycerol Reuse

Reusability of enzyme was examined. The rates of reaction and reached equilibrium FFA concentration was studied in 300 g scale experiments, initializing at around 3.2 wt % FFA with 1% (w/w of FAME) enzyme, 5% glycerol added initially. Rates of reaction were measured on sequential batches of FAME using the same glycerol phase isolated through centrifugation and subsequent decanting of the FAME phase. 6% methanol was added with each batch of FAME.

Results are seen in FIG. 6 Despite a loss of activity loss being observed (see FIG. 6), the majority of activity recovered. Since water forms during esterification, and water accumulates in the glycerol phase, the water concentration on the third batch will necessarily be elevated. Accumulation of water is indirectly observed from the difference between the equilibrium FFA concentrations. A decreased relative distance between initial FFA concentration and achievable equilibrium will ultimately impact the rate, and this explains a portion of the observed decrease in rate. Additionally, the reaction mixture was kept at 40° C. for 6 days between batches, with an additional batch run in between including decanting and therefore additional enzyme loss. The total activity loss is around 15%, meaning around 7.5% per batch, but is largely explainable from the above reasons. Therefore, the results show great enzyme stability in use and potential for reusability and enzyme recovery with a low enzyme addition requirement per batch, when operating at steady state industrially.

Example 4: Stepwise Flash/Reaction Process

Reactions imitating first and second step reactions at high initial water concentrations were performed. Circles: 1% Lipozyme CALB L, 5% glycerol, 4% methanol, 300 g FAME, Initial water 5500 ppm. Triangles: 0.455% Lipozyme CALB L, 5% glycerol, 6% methanol, 30 g FAME, Initial water≈2000 ppm.

The concentration of water governs the obtainable FFA concentration reduction through the equilibrium. Removal of water can be done through flashing, utilizing the difference in boiling points between water and FAME. A stepwise reaction—flashing—reaction system would therefore enable shifting of the equilibrium towards formation of FAME from FFA.

The results of FIG. 8 show reactions at different initial FFA and water concentrations, and the corresponding obtainable FFA conversions. The figure can be used to approximate the required number of reaction steps. Taking the reaction started at 3.6 wt % FFA which reaches equilibrium at 0.9 wt % FFA, drying it, and reacting again with new methanol, should then reach FFA concentrations beneath 0.5 wt % FFA. In fact, these reactions were conducted at elevated water concentrations relative to those obtainable through biodiesel flashing industrially. Typically, at industrial scale, water is controlled by flash prior to reaction. Additionally, less enzyme is added due to recycling of dryer glycerol with enzyme, as established above, causing accumulation of enzyme at steady state, and less water will be added with less new enzyme.

Example 5: Thermal Incubation Study

To investigate the maximum temperature regarding enzyme stability, a thermal incubation experiment was conducted. This reflects the retained activity of the enzyme tested at heating conditions simulating a flash drying process.

30 g scale reactions were performed with 15 minute incubation at indicated temperatures with 6% methanol, 5% glycerol, and 4.55% Lipozyme CALB L. FFA to 10 wt % was added prior to rate measurements. Rate measured at 40° C.

As shown in FIG. 8, CALB was found thermally stable, with no activity loss measured in a mixture holding 5% glycerol and 6% methanol when incubated for 15 minutes at 55° C. This 15 min incubation corresponds to a typical residence time in flash column.

Example 6: Flash Column Simulations

Utilization of the UNIFAC thermodynamic mode (Fredenslund et al. 1975) for simulation of phase equilibria yielded flash column simulations. A simple one-step flash column was simulated operating at 55° C. inlet feed temperatures and 0.15 bar in the column, with an inlet feed consisting of 32.64% M-palmitate, 5.87 wt % M-stearate, 41.00 wt % M-oleate, 7.65 wt % M-linoleate, 4.49 wt % glycerol, 5.39 wt % methanol, 2.70 wt % FFA (oleic acid), and 2500 ppm water, imitating wet crude biodiesel as model FAME, stemming directly from the main Eversa Transform transesterification reaction vessel with 5% glycerol and 6% methanol (w/w of crude FAME) added. This yielded a water concentration of 963 ppm in the resulting liquid flash column outlet, but also reduced the methanol concentration to 2.28 wt %. A more efficient water removal was obtained through a recycle loop around the flash column and heat exchanger, yielding a resulting water concentration of 500 ppm when recycling 60% of the liquid outlet. This means the water concentration might be reduced significantly below the concentrations necessary for obtaining of specification FFA concentrations (<0.25 wt %), especially when considering the results of FIG. 6 above, where 0.35 wt % FFA was measured after reaction initializing at 1.1 wt % FFA and around 2000 ppm water calculated from mass balances.

Process Flow Chart

An example of a process according to the invention is shown in FIG. 2. After the Eversa Transform, water rich components should be mixed and flashed to reduce the water concentration prior to the reaction. After the first reactor, FFA has been converted to FAME yielding an increased water concentration. A second flashing step then removes a significant amount of water and methanol, thereby shifting equilibrium towards further FFA conversion in the second reactor. Finally, a decanting step is used to recycle most of the enzyme, while removing a fraction through a purge to reduce accumulation of undesired by-products. Methanol rich vapor from the flash and the purged enzyme/glycerol phase are recyclable to the Eversa Transform reaction step.

EMBODIMENTS

The invention relates at least to the following embodiments:
1. A process for enzymatic esterification of free fatty acids, comprising the steps of:
   a. providing a composition comprising free fatty acids i),
   b. adding to the composition provided in step a.:
      ii) esterase,
      iii) glycerol, and
      iv) short chain alcohol
         and mixing
   c. incubating the mixture of step b. such that the esterase catalyses esterification of free fatty acids,
   d. flash drying the incubated mixture resulting from step c.,
   e. optionally mixing the flash-dried mixture obtained in step d. with further short chain alcohol v)
   f. incubating the mixture obtained in step e., whereby the esterase ii) provided in step b. catalyses esterification of free fatty acids.
2. The process according to embodiment 1, wherein the flash drying of step d. is done under conditions such that the esterase ii) which has been flash-dried retained at least 40% of its activity
3. The process according to any of the preceding embodiments wherein the flash drying is done at a temperature in the range from 40-75° C.
4. The process according to any of the preceding embodiments wherein the flash drying of step d. is done at a pressure below 250 mbar.
5. The process according to any of the preceding embodiments wherein the flash drying step d. is done for a time period in the range of from 1 to 100 minutes.
6. The process according to any of the preceding embodiments wherein the flash-dried mixture obtained in step d. has a water content in the range from 0-700 ppm.
7. The process according to any of the preceding embodiments wherein the mixture from step c. is not separated prior to the flash drying step of step d.
8. The process according to any of the preceding embodiments wherein the esterase ii) is reused in the range of from 1 to 10 times, for example 1 to 8 times, such as 1 to 6 times, or for example 1 to 5 times.
9. The process according to any of the preceding embodiments further comprising the steps
   d.1—flash drying the incubated mixture resulting from step f.,
   e.1—optionally mixing the flash-dried mixture obtained in step d.1 with further short chain alcohol v), and
   f.1—incubating the mixture obtained in step e.1 whereby the esterase (ii) provided in step b. catalyses esterification of free fatty acids.
10. The process according to any of the preceding embodiments wherein the composition achieved in step f. has a free fatty acid content of less than 5 wt %, such as less than 3 wt %, less than 0.5 wt %, or less than 0.25 wt %; for example in the range of from 0.02 wt % to 5 wt %, for example 0.02 wt % to 3 wt %, such as 0.02 wt % to 2 wt %, 0.02 wt % to 1 wt %.
11. The process according to any of the preceding embodiments, further comprising a step
    g. Separating the mixture obtained in a step f., into a
       vi) light phase, comprising fatty acid methyl ester and
       vii) a heavy phase, comprising esterase, glycerol and short chain alcohol.
12. The process according to embodiment 11 wherein the light phase vi) of step g. has a free fatty acid content of less than 5 wt %, such as less than 3 wt %, less than 0.5 wt %, or less than 0.25 wt %; for example in the range of from 0.02 wt % to 5 wt %, for example 0.02 wt % to 3 wt %, such as 0.02 wt % to 2 wt %, 0.02 wt % to 1 wt %.
13. The process according to embodiment 11 or 12, further comprising a step
    h. drying the light phase (vii) achieved by the separation of step g.
14. The process according to any of the preceding embodiments 11 to 13 further comprising the step i. wherein the heavy phase (vii) from step g. is recycled and added back to the process at step b., thereby supplementing one or more of ii) esterase, iii) glycerol and iv) short chain alcohol that are added in step b.
15. The process any of the preceding embodiments further comprising a step j. of caustic washing.
16. The process according to any of the preceding embodiments wherein the process does not comprise a step of caustic washing.
17. The process according to any of the preceding embodiments wherein the composition i) provided in step a. comprises free fatty acid in an amount in the range of from 0.25 to 10 wt %.
18. The process according to any of the preceding embodiments wherein the composition i) provided in step a. comprises free fatty acid in an amount in the range of from 10 to 90 wt %.
19. The process according to any of the preceding embodiments wherein composition i) provided in step a. is a biodiesel feedstock.
20. The process according to any of the preceding embodiments wherein the composition i) comprising free fatty acids provided in step a., is produced by a process comprising the steps:
    a.1—providing a biodiesel feedstock
    a.2—enzymatic transesterification of free fatty acids to fatty acid methyl esters by lipase
    a.3—separation of heavy phase from light phase
    whereby the composition i) comprises or consists of the light phase achieved in step a.3
21. The process according to any of the preceding embodiments wherein the esterase is an esterase which is active at low water activity.
22. The process according to the invention wherein the esterase ii) is selected from the group consisting of
    (a) a polypeptide comprising or consisting of the sequence *Candida* antartica Lipase B (as disclosed in WO 88/02775 and shown in SEQ ID NO:1 of WO2008065060), *Hyphozyma* sp. lipase (WO 98/018912), *Candida parapsilosis* lipase or combinations thereof.
    (b) a polypeptide which is a subsequence of the amino acid sequences set forth in a);
    (c) a polypeptide having at least 60% sequence identity, such as e.g., at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, to any of the polypeptides defined in (a) and (b).

23. The process according to any of the preceding embodiments wherein in step b. glycerol is added in an amount in the range from 3 to 12 wt % based on composition i).

24. The process according to any of the preceding embodiments wherein in step b. short chain alcohol is added in an amount in the range from 2 to 12 wt %, such as 3 to 11 wt %, for example 3 to 10 wt % such as 3 to 9 wt %, for example 3 to 8 wt %, such as 3 to 7 wt %, for example 3 to 6 wt %; or for example 4 to 9 wt %, such as 4 to 8 wt %, for example 4 to 7 wt % based on composition i).

25. The use of an esterase ii) in a process for according to any of the preceding embodiments.

26. A process for flash drying of a mixture comprising free fatty acids, said mixture comprising FAME, free fatty acids, esterase, glycerol, short chain alcohol and water; and said process comprising the steps of providing said mixture and subsequently flash drying said mixture wherein the flash drying is done under conditions which do not denature the esterase.

The invention claimed is:

1. A process for enzymatic esterification of free fatty acids, comprising the steps of:
   a. providing a composition comprising free fatty acids i),
   b. adding to the composition provided in step a.:
      ii) esterase,
      iii) glycerol, and
      iv) short chain alcohol selected from methanol, ethanol, propanol, and butanol;
      and mixing
   c. incubating the mixture of step b. such that the esterase catalyses esterification of free fatty acids, and
   d. flash drying the incubated mixture resulting from step c., wherein flash drying is performed at a temperature in the range of from 40 to 75° C., and at a pressure less than 250 mbar; and wherein the esterase retains at least 40% of its activity.

2. The process according to claim 1 wherein the flash-dried mixture obtained in step d. has a water content in the range from 0-700 ppm.

3. The process according to claim 1 wherein the mixture from step c. is not separated prior to the flash drying step of step d.

4. The process according to claim 1 further comprising
   e. mixing the flash-dried mixture obtained in step d. with further short chain alcohol v) selected from a group consisting of methanol, ethanol, propanol and butanol; and
   f. incubating the mixture obtained in step e., whereby the esterase ii) provided in step b. catalyses esterification of free fatty acids.

5. The process according to claim 4, further comprising the steps
   d.1 flash drying the incubated mixture resulting from step f.,
   e.1 mixing the flash-dried mixture obtained in step d. 1 with further short chain alcohol v) selected from a group consisting of methanol, ethanol, propanol and butanol, and
   f.1 incubating the mixture obtained in step e.1.

6. The process according to claim 4, further comprising a step
   g. Separating the mixture obtained in a step f., into a
      vi) light phase, comprising fatty acid methyl ester and
      vii) a heavy phase, comprising esterase, glycerol and short chain alcohol selected from a group consisting of methanol, ethanol, propanol and butanol.

7. The process according to claim 6 wherein the light phase vi) of step g. has a free fatty acid content of less than 5 wt %.

8. The process according to claim 6, further comprising a step
   h. drying the light phase (vii) light phase (vi) achieved by the separation of step g.

9. The process according to claim 6 further comprising the step i. wherein the heavy phase vii) from step g. is recycled and added back to the process at step b., thereby supplementing one or more of ii) esterase, iii) glycerol and iv) short chain alcohol that are added in step b.

10. The process according to claim 6, further comprising a step j. of caustic washing of the light phase vi).

11. The process according to claim 6, wherein the process does not comprise a step of caustic washing of the light phase vi).

12. The process according to claim 1 wherein the composition i) provided in step a. comprises free fatty acid in an amount in the range of from 0.25 to 10 wt %.

13. The process according to claim 1 wherein the composition i) provided in step a. comprises free fatty acid in an amount in the range of from 10 to 90 wt %.

14. The process according to claim 1 wherein composition i) provided in step a. is a biodiesel feedstock selected from the group consisting of castor oil, cottonseed oil, corn oil, palm oil, peanut oil, rapeseed oil, rice bran oil, soybean oil, fish oil, tallow, lard, mutton oil, yeast oil, microagal oil, fatty acid distillates and combinations thereof.

15. The process according to claim 1 wherein the composition i) comprising free fatty acids provided in step a. is produced by a process comprising the steps:
   a.1 providing a biodiesel feedstock
   a.2 enzymatic transesterification of free fatty acids to fatty acid methyl esters by lipase
   a.3 separation of heavy phase from light phase
   whereby the composition i) comprises or consists of the light phase achieved in step a.3.

16. A process for flash drying of a mixture comprising free fatty acids, said mixture comprising FAME, free fatty acids, esterase, glycerol, short chain alcohol selected from methanol, ethanol, propanol, and butanol; and water; and said process comprising the steps of providing said mixture and subsequently flash drying said mixture, wherein the flash drying is performed at a temperature in the range of from 40 to 75° C., and at a pressure less than 250 mbar, and wherein the esterase retains at least 40% of its activity.

17. The process according to claim 1 wherein the esterase is a lipase.

* * * * *